(12) United States Patent
Seeman et al.

(10) Patent No.: US 8,368,369 B2
(45) Date of Patent: Feb. 5, 2013

(54) SINGLE-BOUND HYSTERETIC REGULATION OF SWITCHED-CAPACITOR CONVERTERS

(75) Inventors: Michael Seeman, Los Altos, CA (US); Rinkle Jain, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 530 days.

(21) Appl. No.: 12/566,730

(22) Filed: Sep. 25, 2009

(65) Prior Publication Data

US 2011/0074371 A1    Mar. 31, 2011

(51) Int. Cl.
*G05F 1/44* (2006.01)
(52) U.S. Cl. ...................................................... 323/282
(58) Field of Classification Search .................. 323/259, 323/265, 272, 282–288, 351
See application file for complete search history.

(56) References Cited

U.S. PATENT DOCUMENTS

| | | | | |
|---|---|---|---|---|
| 5,920,219 A * | 7/1999 | Young et al. | | 327/227 |
| 6,177,787 B1 * | 1/2001 | Hobrecht | | 323/283 |
| 6,903,536 B2 * | 6/2005 | Yang | | 323/266 |
| 6,933,710 B2 * | 8/2005 | Shieh | | 323/282 |
| 7,432,689 B2 * | 10/2008 | Miller et al. | | 323/259 |
| 7,957,938 B2 * | 6/2011 | LaMarche et al. | | 702/189 |
| 7,999,527 B2 * | 8/2011 | Yang et al. | | 323/284 |

OTHER PUBLICATIONS

Seeman, "A Design Methodology for Switched-Capacitor DC-DC Converters", Electrical Engineering and Computer Sciences University of California at Berkeley. Technical Report No. UCB/EECS-2009-78. May 21, 2009. Chapters 4 and 5.
Seeman, et al., "What About Switched Capacitor Converters?", Profs. Seth Sanders and Elad Alon EECS Department, UC Berkeley. Mar. 2008 http://www.powersoc.org/Presentations/Received/Invited%20Talk%20S5x5%20-%20Seth%20Sanders%20-%20What%20about%20switched%20capacitor%20converters.pdf.

* cited by examiner

*Primary Examiner* — Adolf Berhane
(74) *Attorney, Agent, or Firm* — Jordan IP Law, LLC

(57) ABSTRACT

A voltage regulator may include a comparator with a first comparator input to receive a reference voltage, a second comparator input to receive an output voltage from a phase interleaved converter, and a comparator input. The regulator may also include a set of cascaded flip-flops corresponding to phases of the converter. The set of cascaded flip-flops may have a plurality of phase outputs to trigger a phase transition in the converter if the output voltage falls below the reference voltage.

19 Claims, 3 Drawing Sheets

SINGLE-BOUND HYSTERETIC REGULATION OF SWITCHED-CAPACITOR CONVERTERS

BACKGROUND

1. Technical Field

Embodiments generally relate to the regulation of voltage converters. In particular, embodiments relate to single-bound hysteretic regulators for switched-capacitor voltage converters.

2. Discussion

Direct current to direct current (DC-DC) converters such as inductor-based and switched-capacitor converters can be useful in a wide variety of applications. In silicon integrated DC-DC converter applications, however, inductors may present concerns with regard to fabricating magnetic material in a standard complementary metal oxide semiconductor (CMOS) process. Additionally, switched-capacitor converters may require the use of regulation with a dedicated clock or voltage controlled oscillator, which can add to power and area overhead.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments of the present invention provide for an apparatus such as a voltage regulator having a comparator and a set of cascaded flip-flops. The comparator may have a first comparator input to receive a reference voltage signal and a second comparator input to receive an output voltage signal from a phase interleaved converter. The comparator may also include a comparator output. Each flip-flop in the set of cascaded flip-flops may correspond to a phase of the converter, wherein the set of cascaded flip-flops have a plurality of clock inputs coupled to the comparator output. The set of cascaded flip-flops can have a plurality of phase outputs to trigger a phase transition in the converter if the output voltage signal falls below the reference voltage signal.

Other embodiments provide for an apparatus such as a computer system having a processor core, a phase interleaved direct current to direct current (DC-DC) voltage converter coupled to the processor core, and a voltage regulator. The converter may have a voltage input, a clock input and a voltage output. The voltage regulator may include a comparator with a first comparator input to receive a reference voltage signal, a second comparator input coupled to the voltage output of the converter, and a comparator output. The voltage regulator may also include a set of cascaded flip-flops corresponding to phases of the converter. The set of cascaded flip-flops can have a plurality of clock inputs coupled to the comparator output, and a plurality of phase outputs coupled to the converter. The plurality of phase outputs may trigger a phase transition in the converter if an output voltage of the converter falls below the reference voltage signal. The processor core, the converter and the voltage regulator may be integrated into a common system on chip (SoC) so that they share the same die.

Other embodiments provide for a method in which a reference voltage signal is compared to an output voltage signal from a phase interleaved converter. A phase transition may be triggered in the converter if the output voltage signal falls below the reference voltage signal.

Figure 1:
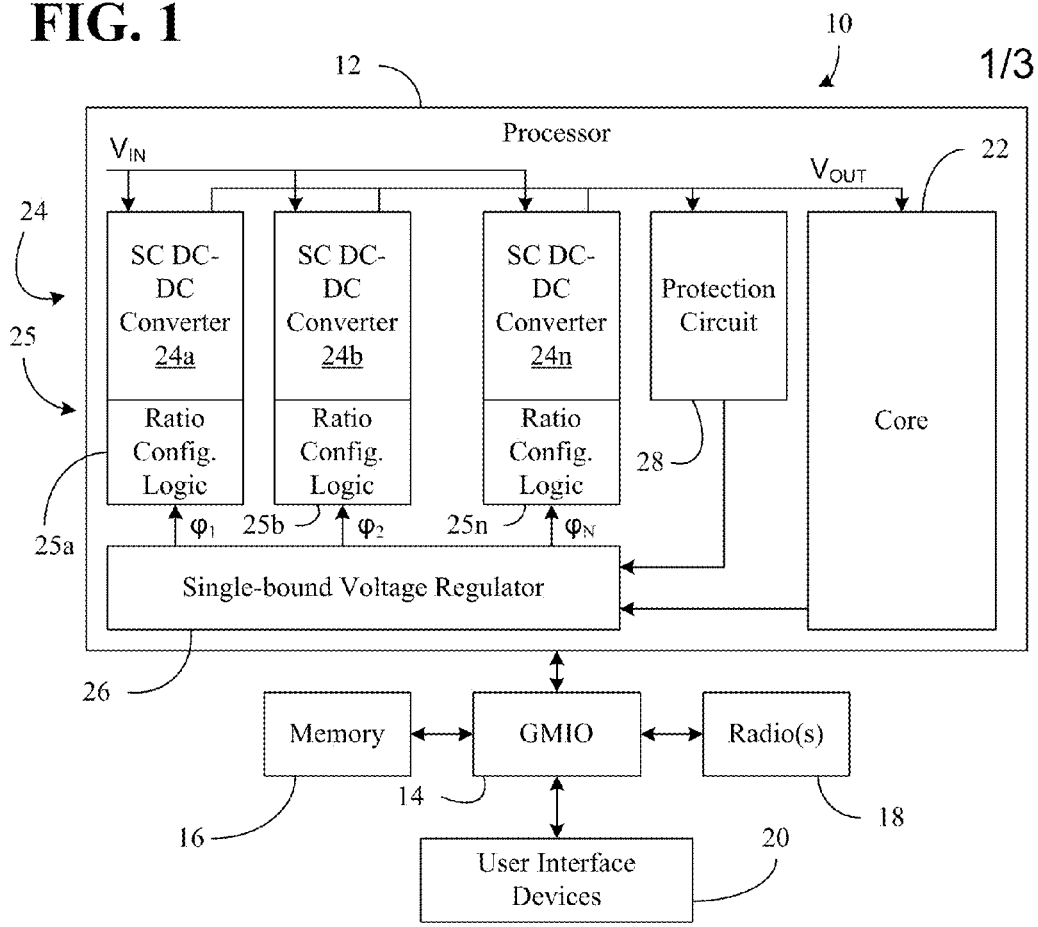
FIG. 1 is a block diagram of an example of a platform according to an embodiment.

FIG. 1 shows a system 10 that may be a portion of a computing platform such as a test system, design/debug tool, laptop, personal digital assistant (PDA), wireless smart phone, media player, imaging device, or any other suitable apparatus. The illustrated system 10 includes one or more processors 12, a graphics/memory/input/output (GMIO) control 14, memory 16, a wireless interface/radio 18, and user interface devices 20. The illustrated processor 12 functions as a host processor that includes a phase interleaved switched-capacitor (SC) DC-DC converter 24 (24a-24n) with ratio configuration logic 25 (25a-25n), and a processor core 22. The processor 12 could also have a multi-core configuration. A DC input voltage signal/level/potential $V_{IN}$ might be obtained from a battery (not shown) or other rail source that is not directly usable by the processor core 22. Thus, the converter 24 may convert the input voltage signal into a DC output voltage signal level/potential $V_{OUT}$, which the processor core 22 can use during operation to perform various computing tasks.

The illustrated processor 12 also includes a single-bound hysteretic voltage regulator 26 that is configured to trigger a phase transition in the converter 24 if the output voltage signal of the converter 24 falls below a reference voltage signal. The reference voltage signal may constitute the minimum load voltage for the processor core 22 and the phase transition can generate a charge boost in the converter 24 so that the processor core 22 is provided with the appropriate operating voltage. Such an approach may be considered "single-bound" because it uses a minimum bound without using a maximum bound to control operation. As will be discussed in greater detail, the switched-capacitor topology of the converter 24 and the fact that the illustrated regulator 26 does not require a voltage controlled oscillator (VCO) or dedicated clock can enable the processor core 22, converter 24 and regulator 26 to be integrated into a common system on chip (SoC) so that they share the same die. Using on-die components in this fashion can provide significant area savings.

The processor 12 may also include a protection circuit 28 coupled to the voltage output of the converter 24, wherein the protection circuit 28 can modify operation of the regulator 26 if the output voltage signal of the converter 24 remains below the reference voltage signal for a predetermined period of time. Such a condition might occur if the output voltage remains below the reference voltage after a switching event, or starts up below the reference voltage. Thus, the illustrated protection circuit 28 ensures that the converter output does not fall permanently below the reference voltage. The protection circuit 28 may use a permanently running clock (e.g., to increase a frequency of a clock signal applied to the converter) or a comparator with a relatively slow response time to achieve the proper adjustment.

The processor 12 may be coupled to the memory 16, radios 18, and user interface devices 20 through the GMIO control 14. The GMIO control 14 may include one or more blocks (e.g., chips or units within an integrated circuit) to perform various interface control functions (e.g., memory control, graphics control, I/O interface control, and the like). These circuits may be implemented on one or more separate chips and/or may be partially or wholly implemented within the processor 12.

The memory 16 can include one or more memory blocks to provide additional RAM to the processor 12. It may be implemented with any suitable memory including but not limited to dynamic RAM (DRAM), static RAM (SRAM), flash memory, or the like. The radios 18 may wirelessly couple the processor 12 to a wireless network (not shown). The user interface devices 20 may include one or more devices such as a display, keypad, mouse, etc. to allow a user to interact with and perceive information from the system 10. The GMIO control 14, memory 16, radios 18 and/or user interface devices 20 may also include one or more phase interleaved switched-capacitor DC-DC converters such as the converter 24 and one or more single-bound voltage regulators such as the regulator 26.

As already noted, the system 10 may implement a variety of different computing devices or other appliances with computing capability. Such devices include but are not limited to test systems, design/debug tools, laptop computers, notebook computers, PDAs, cellular phones, audio and/or video media players, desktop computers, servers, and the like. The system 10 could constitute one or more complete computing systems or alternatively, it could constitute one or more components useful within a computing system.

Figure 2:
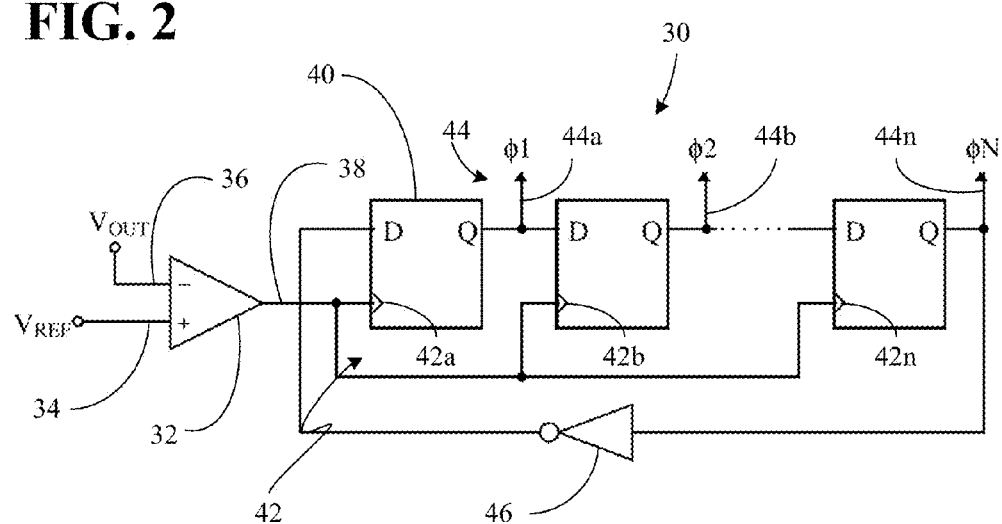
FIG. 2 is a schematic diagram of an example of a voltage regulator according to an embodiment.

Turning now to FIG. 2, a single-bound hysteretic voltage regulator 30 is shown. The regulator 30 may be used to control a switched-capacitor DC-DC converter and can therefore be readily substituted for the regulator 26 (FIG. 1), already discussed. In the illustrated example, the regulator 30 includes a comparator 32 having a first comparator input 34 to receive the reference voltage signal $V_{REF}$, a second comparator input 36 to receive the output voltage signal $V_{OUT}$ from a phase interleaved converter, and a comparator output 38. The regulator 30 may also include a set of cascaded flip-flops 40 corresponding to phases ($\phi_1$ through $\phi_N$) of the converter. As will be discussed in greater detail, the converter can have an opposite and non-overlapping multi-phase configuration, which may help reduce ripple voltage. The regulator 30 may also include an inverter 46 coupled between the last stage of the set of cascaded flip-flops 40 and the first stage of the set of cascaded flip-flops 40 to ensure the proper switching operation of the individual flip-flops.

The illustrated set of cascaded flip-flops 40 has a plurality of clock inputs 42 (42a-42n) coupled to the comparator output 38, and a plurality of phase outputs 44 (44a-44n). The phase outputs 44 can trigger phase transitions in the converter if the output voltage signal falls below the reference voltage signal. In particular, when the output voltage falls beneath the reference voltage, one of the phases ($\phi_1$ through $\phi_N$) of the interleaved converter may be toggled (e.g., switched from phase 1 to phase 2 or vice versa). This action can deliver charge to the output of the converter and therefore boost the output voltage signal above the reference voltage. The process may then repeat indefinitely. Although D flip-flops are shown, other configurations using set-reset (SR), toggle (T), JK flip-flops, etc., may alternatively be used. The response time of the comparator 32 may be selected to be below a predetermined time threshold so that regulator 30 has sufficient responsiveness to drive the converter.

With regard to operation of the converter 24 (FIG. 1), output ripple in an SC converter can be attributable to the impulse-like charge transfer in slow switching limit (SSL) operation. Typical converters have resistive loads (or current-source-like loads) with an output capacitor wherein the output capacitor filters the impulses of charge from the SC converter while supplying a near-constant current to the load. Where a step-up converter delivers charge to the load once per period, and is operating solely in the SSL, the converter's peak-to-peak output voltage ripple would equal:

$$V_R = \frac{I_{OUT}}{f_{sw}C_{OUT}} \qquad \text{Equation 1}$$

Where $V_R$ is the ripple voltage, $I_{OUT}$ is the output current, $C_{OUT}$ is the output capacitance and $f_{sw}$ is the switching frequency. Since the switching frequency of a converter is roughly proportional to the output current, the output ripple amplitude will remain constant over a wide range of power levels, and is simply related to the converter design and output capacitance.

Because practical ripple requirements may dictate that the output capacitor should be large for many applications, the output capacitor can add significantly to the die or board area requirement of the converter. For many applications, the required output capacitance could dominate the flying capacitors of the converter. Embodiments described herein provide for using multiple interleaved phases with opposite and non-overlapping components to reduce the ripple voltage without increasing the size of the output capacitor.

Figure 3:
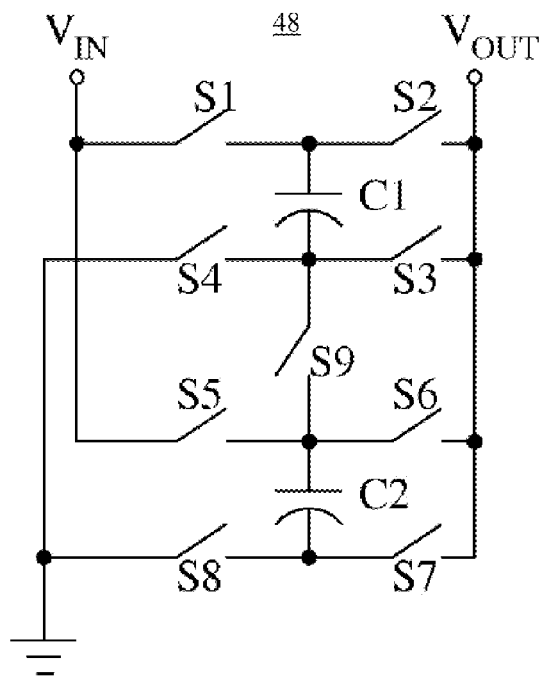
FIG. 3 is a schematic diagram of an example of a phase interleaved converter according to an embodiment.

For example, FIG. 3 shows one phase of an N-phase interleaved SC converter 48. In the illustrated example, the converter 48 includes flying capacitors C1 and C2, and MOSFETs, modeled as switches S1-S9, which may be operated in two opposite and non-overlapping phases to reduce ripple voltage without increasing the size of the capacitor. In particular, a first phase $\phi_1$ can be established by charging the flying capacitors from $V_{IN}$ through switches 51 and S5, and delivering charge from the flying capacitors to $V_{OUT}$ through switches S3 and S7. An opposite and non-overlapping phase $\overline{\phi_1}$ can be established by charging the flying capacitors from the load through switches S4 and S8, and delivering charge from the flying capacitors to $V_{OUT}$ through switches S2 and S6. An example of a truth table for a 2:1 conversion ratio is shown below in Table 1, and an example of a truth table for a 3:1 conversion ratio is shown below in Table 2.

TABLE 1

| 2:1 Conversion | | |
|---|---|---|
| SW | $\phi_1$ | $\overline{\phi_1}$ |
| S1 | ON | OFF |
| S2 | OFF | ON |
| S3 | ON | OFF |
| S4 | OFF | ON |
| S5 | ON | OFF |
| S6 | OFF | ON |
| S7 | ON | OFF |
| S8 | OFF | ON |
| S9 | OFF | OFF |

TABLE 2

| 3:2 Conversion | | |
|---|---|---|
| SW | $\phi_1$ | $\overline{\phi_1}$ |
| S1 | ON | OFF |
| S2 | OFF | ON |

TABLE 2-continued

3:2 Conversion

| SW | $\phi_1$ | $\overline{\phi_1}$ |
|----|----------|---------------------|
| S3 | ON | OFF |
| S4 | OFF | OFF |
| S5 | ON | OFF |
| S6 | OFF | OFF |
| S7 | ON | OFF |
| S8 | OFF | ON |
| S9 | OFF | ON |

Thus, by clocking and tightly controlling the switching of the illustrated components, a nearly continuous charge may be delivered to the output of the converter. As already noted, using interleaved phases can reduce the output ripple for a given switching frequency. In an SC converter using N interleaved phases, the topology used can be replicated N times and each component linearly scaled by 1=N in size. The clock feeding each of the interleaved phases may be offset by an angle of 360°=N. In SSL operation, by having N interleaved phases, the output ripple can be reduced by a factor of N. A practical limit to the number of interleaved phases used may arise when the control and gate-drive power of each interleaved phase becomes a significant contributor to the power loss.

Figure 4:
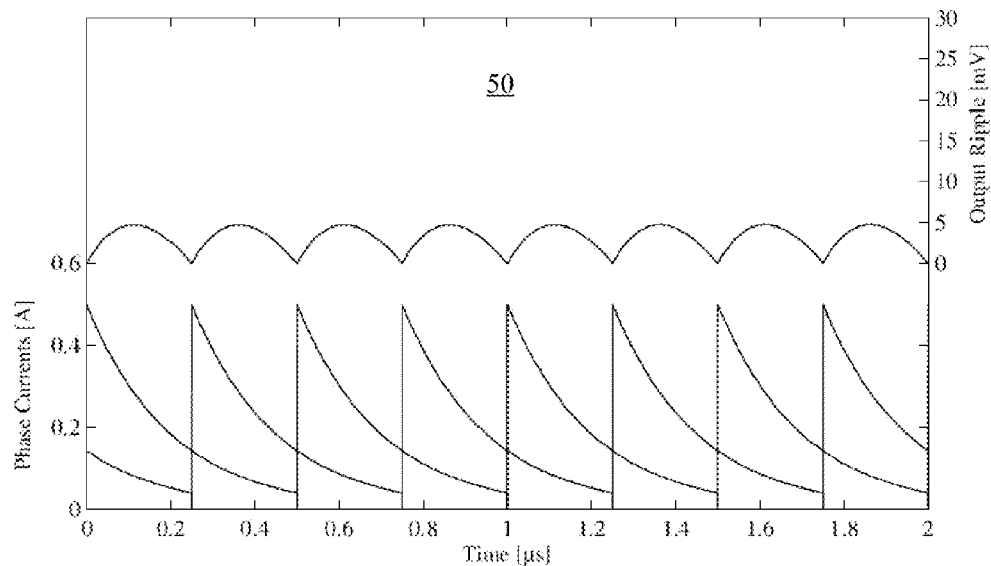
FIG. 4 is a plot of an example of phase current and output ripple voltage waveforms according to an embodiment.

FIG. 4 shows a plot 50 of the output voltage ripple and the current delivered to the output of the converter in each of four interleaved phases. In the full-load case where the switching period is on the order of the RC time constant, the interleaved current pulses average to a low-amplitude output current, thus dramatically reducing the output ripple.

Figure 5:
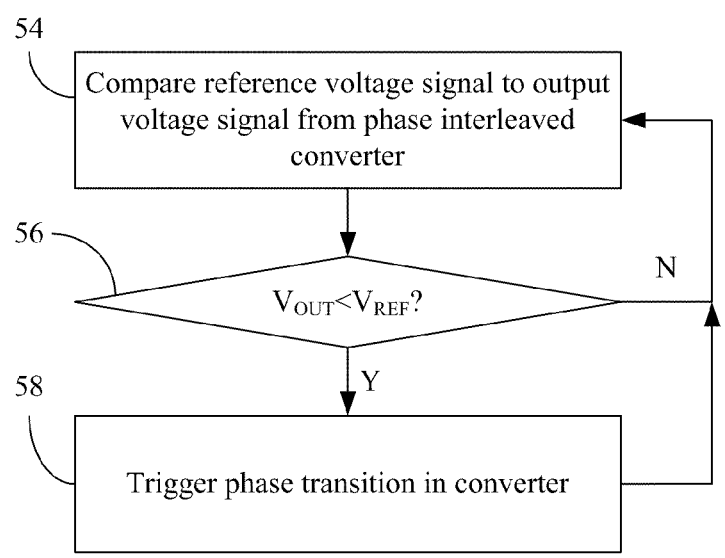
FIG. 5 is a flowchart of an example of a method of operating a single-bound hysteretic voltage regulator according to an embodiment.

Turning now to FIG. 5, a method 52 of operating a single-bound voltage regulator is shown. The method 52 may be implemented in fixed-functionality hardware using circuit technology such as application specific integrated circuit (ASIC), complementary metal oxide semiconductor (CMOS) or transistor-transistor logic (TTL) technology, or any combination or variation thereof. Processing block 54 provides for comparing a reference voltage signal to an output voltage signal from a phase interleaved converter. If it is determined at block 56 that the output voltage signal has fallen below the reference voltage signal, block 58 provides for triggering a phase transition in the converter.

Embodiments described herein are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A voltage regulator comprising:
a comparator having a first comparator input to receive a reference voltage signal, a second comparator input to receive an output voltage signal from a phase interleaved converter, and a comparator output; and
a set of cascaded flip-flops corresponding to phases of the converter, the set of cascaded flip-flops having a plurality of clock inputs coupled to the comparator output, and a plurality of phase outputs to trigger a phase transition in the converter if the output voltage signal falls below the reference voltage signal.

2. The voltage regulator of claim 1, wherein the phase transition is to generate a charge boost in the converter.

3. The voltage regulator of claim 1, wherein the reference voltage signal is to be a minimum load voltage signal.

4. The voltage regulator of claim 1, wherein the set of cascaded flip-flops includes a plurality of D flip-flops.

5. The voltage regulator of claim 4, wherein the set of cascaded flip-flops further includes an inverter coupled between a last stage of the set of cascaded flip-flops and a first stage of the set of cascaded flip-flops.

6. The voltage regulator of claim 1, wherein the comparator has a response time that is below a predetermined time threshold.

7. The voltage regulator of claim 1, further including a protection circuit to receive the output voltage signal from the converter and increase a frequency of a clock signal applied to the converter if the output voltage signal of the converter remains below the reference voltage signal for a predetermined period of time.

8. A computer system comprising:
a processor core;
a phase interleaved direct current to direct current (DC-DC) voltage converter coupled to the processor core, the converter having a voltage input and a voltage output; and
a voltage regulator having,
  a comparator with a first comparator input to receive a reference voltage signal, a second comparator input coupled to the voltage output of the converter, and a comparator output, and
  a set of cascaded flip-flops corresponding to phases of the converter, the set of cascaded flip-flops having a plurality of clock inputs coupled to the comparator output, and a plurality of phase outputs coupled to the converter, the plurality of phase outputs to trigger a phase transition in the converter if an output voltage signal of the converter falls below the reference voltage signal, wherein the processor core, the converter and the voltage regulator are integrated into a common system on chip.

9. The computer system of claim 8, wherein the phase transition is to generate a charge boost in the converter.

10. The computer system of claim 8, wherein the reference voltage signal is to be a minimum processor core voltage signal.

11. The computer system of claim 8, wherein the set of cascaded flip-flops includes a plurality of D flip-flops.

12. The computer system of claim 11, wherein the set of cascaded flip-flops further includes an inverter coupled between a last stage of the set of cascaded flip-flops and a first stage of the set of cascaded flip-flops.

13. The computer system of claim 8, wherein the comparator has a response time that is below a predetermined time threshold.

14. The computer system of claim 8, further including a protection circuit coupled to the voltage output, the protection circuit to increase a frequency of a clock signal applied to the converter if the output voltage signal of the converter remains below the reference voltage signal for a predetermined period of time.

15. A method comprising:
comparing a reference voltage signal to an output voltage signal from a phase interleaved converter; and
using a set of cascaded flip-flops to trigger a phase transition in the converter if the output voltage signal falls below the reference voltage signal, wherein the set of cascaded flip-flops correspond to phases of a converter, and wherein the set of cascaded flip-flops have a plurality of clock input coupled to a comparator output.

16. The method of claim 15, wherein the phase transition generates a charge boost in the converter.

17. The method of claim 15, wherein triggering the phase transition includes toggling a set of cascaded flip-flops corresponding to phases of the converter.

18. The method of claim 15, wherein the reference voltage is a minimum load voltage.

19. The method of claim 15, wherein the phase interleaved converter is a direct current to direct current (DC-DC) voltage converter.

* * * * *